United States Patent Office 3,506,650
Patented Apr. 14, 1970

3,506,650
1α-ALKOXY-Δ⁴-3-KETO PREGNENES, 3-ENOL ETHER THEREOF AND PROCESS FOR THEIR PREPARATION
Rinaldo Gardi, Carate Brianza, and Pier Paolo Castelli, Monza, Italy, assignors, by mesne assignments, to Warner-Lambert Pharmaceutical Company, Morris Plains, N.J., a corporation of Delaware
No Drawing. Filed May 22, 1967, Ser. No. 640,400
Claims priority, application Germany, Nov. 18, 1966, 1,593,699
Int. Cl. C07c 173/10
U.S. Cl. 260—239.55                 15 Claims

ABSTRACT OF THE DISCLOSURE

New 1α-alkoxy-3,11,20-triketo-Δ⁴-pregnenes and 3-alkyl enol ethers thereof are prepared from corresponding Δ¹,⁴-3-keto-pregnadienes by concurrent action of an alkanol and an alkyl orthoformate.

BACKGROUND OF THE INVENTION

This invention relates to new 1α-alkoxy-17α,21-dihydroxy-3,11,20-triketo-Δ⁴-pregnenes, to their corresponding 3-enol ethers and to a process for the preparation of such compounds from 17α,21-dihydroxy-3,11,20-triketo-Δ¹,⁴-pregnadienes.

It is known that the 3-ketone in the Δ¹,⁴-3-keto system possess a very low degree of reactivity, wherefore a protection of such a grouping by direct formation of 3-enol ethers is not possible.

SUMMARY OF THE INVENTION

It has now been found that in a well delimited class of Δ¹,⁴-3-keto-pregnadienes containing an 11-keto group it is possible to obtain a suitable protection and activation of the Δ¹,⁴-3-keto system by submitting a 3,11,20-triketo-17α,21-dihydroxy-Δ¹,⁴-pregnadiene, its esters and/or ketals thereof to the concurrent action of a lower alkyl orthoformate and a lower alkanol at moderate temperature and in the presence of an acid catalyst. According to the different working conditions, a corresponding 1α-alkoxy-3,11,20-triketo-17α,21-dihydroxy-Δ⁴-pregnene or a corresponding 1α,3 - dialkoxy - 11,20-diketo-17α,21-dihydroxy-Δ³,⁵-pregnadiene, is obtained in good yield.

The new 1α-alkoxy-Δ⁴-3-keto-pregnenes and their 3-alkyl-enol ethers of this invention are easily re-converted by hydrolysis into the corresponding 3-keto-Δ¹,⁴-pregnadienes and therefore are useful as intermediates for carrying out reactions not otherwise possible, for example introducing directly a halogen atom into the 6 position in a Δ¹,⁴-3-keto-pregnadiene.

DETAILED DESCRIPTION OF THE INVENTION

The new steroid compounds of this invention are characterized by the following general formulas

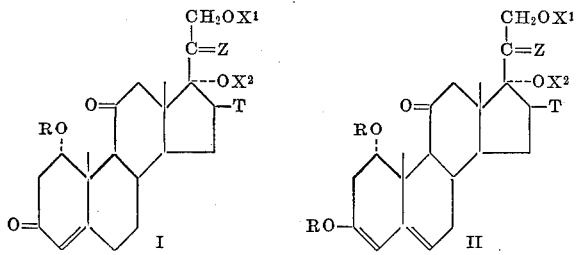

in which R is lower alkyl, T represents hydrogen, methylene, α-methyl, β-methyl, α-halogen or β-halogen, Z represents ketonic oxygen or a lower alkylene ketal and X¹ and X² represent hydrogen or acyl groups derived from carboxylic acids containing up to 9 carbon atoms.

The term "lower alkyl" includes alkyl radicals up to 5 carbon atoms, such as methyl, ethyl, propyl, butyl and pentyl radicals, methyl and ethyl being preferred.

The acyl groups derived from carboxylic acids containing up to 9 carbon atoms include saturated and unsaturated aliphatic acyl, benzoyl, substituted benzoyl, arylaliphatic acyl, cycloaliphatic acyl and cycloalkyl aliphatic acyl. Representative esters are the acetate, propionate, trimethylacetate, butyrate, isobutyrate, valerate, caproate, oenanthate, benzoate, phenylpropionate, cyclopentylpropionate and cyclohexylacetate.

The term "lower alkylene ketal" is used herein to indicate ketal derivatives with lower alkylene glycols, such as ethylene glycol, 1,2-propylene glycol, 1,3-propylene glycol, 1,2-butylene glycol, 1,3-butylene glycol and the like. Preferred ketal group is ethylene glycol ketal.

The process of the present invention is accomplished by treating a compound of the formula:

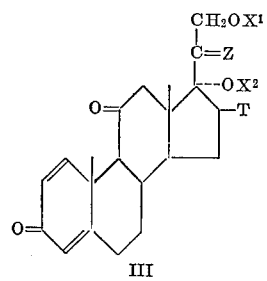

in which T, X¹, X² and Z have the above stated meaning, with a lower alkyl orthoformate and a lower alkanol of formula ROH, in which R is as hereinbefore defined, under anhydrous conditions at a temperature below 60° C. in the presence of an acid catalyst.

The reaction may be carried out in an ether or hydrocarbon solvent, such as diethyl ether, tetrahydrofurane, dioxane, benzene, hexane, isooctane and like as well as in halogenated hydrocarbons such as methylene chloride, chloroform or carbon tetrachloride.

Suitable acid catalysts are the aromatic sulfonic acids such as toluene, benzene and naphthalene sulfonic acids, salts of organic bases with strong acids, such as pyridine hydrochloride or pyridine tosylate as well as Lewis acids. Preferred acid catalyst is p-toluene sulfonic acid.

The mixture is maintained at a temperature below 60° C. for a period from about 30 minutes to about 4 hours, preferably under stirring; generally after an hour at room temperature the reaction can be considered to be over. By neutralizing the reaction mixture with a few drops of a base, particularly pyridine, there is obtained as final product a 1α,3-dialkoxy-Δ³,⁵-pregnadiene of Formula II, which can be isolated according to conventional methods, for example by evaporation of the solvent and recrystallization of the residue or by direct precipitation with water. Sometimes the precipitation may be favoured by letting the mixture to stand in an ice-box for a short time.

Otherwise, if the reaction mixture is not neutralized, but directly worked under aqueous acidic conditions, for example by adding thereto a few drops of water or of a dilute acid, there is obtained as final product a 1α-alkoxy-Δ⁴-3-keto-pregnene of Formula I which can be isolated according to the usual techniques. Said 1α-alkoxy-Δ⁴-3-keto-pregnenes can be also obtained from the corresponding 1α,3-dialkoxy-Δ³,⁵-pregnadienes (II), isolated as above, by mild acid hydrolysis, for example by treatment with dilute hydrochloric acid at room temperature for a short time.

In carrying out the process of the present invention it is necessary to bear in mind that both the alcohol and the orthoformate participate in the reaction. Therefore the lower alkanol and the lower alkyl orthoformate should have the same alkyl radical in order to obtain a single reaction product, that is a 1α-3-dialkoxy-Δ$^{3,5}$-pregnadiene of Formula II or a corresponding 1α-alkoxy-Δ$^4$-3-ketopregnene of Formula I.

It may occur however, that particular lower alkyl orthoformates are not promptly available, for example when typical alcohols such as butyl or pentyl alcohols are involved in the reaction. In this case, one can employ as reaction components the easily available ethyl orthoformate together with the desired alcohol. According to the working conditions there is obtained a main product consisting of a 1α - alkoxy or a 1α,3 -dialkoxy derivative in which the alkoxy radical is that of the alcohol employed, and a by-product consisting of the corresponding 1α-ethoxy or a 1α,3 - dialkoxy derivative in which the alkoxy radical is that of the alcohol employed, and a by-product consisting of the corresponding 1α-ethoxy or 1α,3-diethoxy derivative. The two products so obtained can be separated from each other, for example by fractional crystallization or by chromatography. The amount of the two products depends on the nature and the proportions of the reagents; however only one product can be practically obtained if the chosen alcohol is employed in excess over the ethyl orthoformate.

It will be up to those skilled in the art to select everytime the more suitable reaction conditions to obtain the best yield of the final product; it is however necessary to point out that methanol and methyl orthoformate are highly reactive, so that it is advisable to limit their use to the preparation of the 1α-methoxy and 1α,3-dimethoxy derivatives.

The new compounds of the present invention can be advantageously employed as intermediates in the preparation of physiologically active antiinflammatory steroids, such as 6 - halo - 11-oxygenated-3-keto-Δ$^{1,4}$-pregnadienes. For example a fluorine atom can be introduced into the 6 pisition of the streoid molecule by treating the 1α,3-dialkoxy-Δ$^{3,5}$-pregnadienes of Formula II with perchloryl fluoride, after having previously reduced, if necessary, the 11-keto to the 11β-hydroxy-group by means of an alkali metal borohydride or a lithium and aluminum hydride. By further strong acid hydrolysis the Δ$^{1,4}$-3-keto group can be easily restored. Alternatively, 6-fluoro derivatives may be obtained from 1α-alkoxy-Δ$^4$-3-keto-pregnenes of Formula I, by converting these compounds into suitable functional derivatives such as ketals, enamines or other enol derivatives, capable of activating the C–6 position and thus allowing introduction of a fluorine atom in such position. Analogous reactions may give rise to the corresponding 6-chloro derivatives.

The following examples illustrate the invention.

EXAMPLE 1

A mixture of 5 g. of prednisone, 25 cc. of anhydrous tetrahydrofurane, 6 cc. of methyl orthoformate, 15 cc. of methanol and 125 mg. of p-toluenesulfonic acid is maintained under stirring at room temperature for about 90 minutes. The mixture is neutralized by addition of a few drops of pyridine and concentrated under vacuum. The residue, taken up with methanol, give 2,3 g. of 1α, 3 - dimethoxy - Δ$^{3,5}$ - pregnadiene-17α,21-diol-11,20-dione; M.P. 204–206° C.; [α]$_D^{22}$=+50° (dioxane, c.=0.5%).

EXAMPLE 2

In 50 cc. of benzene there are added 5 g. of prednisone 17-acetate, 6 cc. of methyl orthoformate, 15 cc. of methanol and 300 mg. of p-toluenesulphonic acid. The mixture is maintained under stirring at room temperature for two hours, then it is concentrated under vacuum. The residue, taken up with little methanol and crystallizetd gives the 1α, 3 - dimethoxy - Δ$^{3,5}$ - pregnadiene-17α,21-diol-11,20-dione 17-acetate; M.P. 200–202° C. (dec.); [α]$_D^{22}$=−27° (dioxane, c.=0.5%).

EXAMPLE 3

A mixture of 1 g. of prednisone 21-acetate in 5 cc. of anhydrous tetrahydrofurane, 0.5 cc. of methyl orthoformate, 2 cc. of absolute methanol and 25 mg. of p-toluene sulphonic acid is maintained under stirring at room temperature for about 90 minutes. The resulting mixture is neutralized with a few drops of pyridine and concentrated with vacuum. The crystalline residue so obtained, taken up with methanol, gives the 1α,3-dimethoxy-Δ$^{3,5}$-pregnadiene - 17α,21 - diol - 11,20-dione 21-acetate; M.P. 256–258° C., [α]$_D^{22}$=+92° (dioxane, c.=0.5%).

EXAMPLE 4

A solution of 2,5 g. of prednisone 21-acetate 20-ethylene ketal in 30 cc. of methanol is treated with 6 cc. of methyl orthoformate and 100 mg. of pyridine tosylate. After about two hours at room temperature the mixture is neutralized with pyridine and concentrated under vacuum. The residue, taken up with methanol, gives the 1α,3-dimethoxy - 20 - ethylenedioxy - 21-acetoxy-Δ$^{3,5}$-pregnadiene-17α-ol-11-one; M.P. 174° C. (dec.), [α]$_D^{22}$=+31° (dioxane, c.=0.5%).

EXAMPLE 5

5 g. of prednisone 21-acetate in 25 cc. of dioxane, 8 cc. of ethyl orthoformate, 15 cc. of ethyl alcohol and 100 mg. of pyridine hydrochloride, are stirred at room temperature for about two hours. The reaction mixture is neutralized with a few drops of pyridine and concentrated under vacuum. The residue, taken up with methanol, gives the 1α,3 - diethoxy - Δ$^{3,5}$ - pregnadiene-17α,21-diol-11,20-dione 21- acetate; M.P. 215–218° C., [α]$_D^{22}$=+94° (dioxane, c.=0.5%).

In the Table I there are reported other examples of preparation of 1α,3-dialkoxy-Δ$^{3,5}$-pregnadienes obtainable according to the procedure set forth in the Examples 1–5.

TABLE I

| Example No. | Starting compound | Lower alkyl orthoformate | Lower alkanol | Final product |
| --- | --- | --- | --- | --- |
| 6 | Prednisone 17,21-diacetate | MOF | Methanol | 1α, 3-dimethoxy-Δ$^{3,5}$-pregnadiene-17α, 21-diol-11, 20-dione 17, 21-diacetate. |
| 7 | Prednisone 17, 21-dipropionate. | MOF | do | 1α, 3-dimethoxy-Δ$^{3,5}$-pregnadiene-17α, 21-diol-11, 20-dione 17, 21-dipropionate. |
| 8 | Prednisone 17-butyrate-21-acetate. | MOF | do | 1α, 3-dimethoxy-Δ$^{3,5}$-pregnadiene-17α, 21-diol-11, 20-dione 17-butyrate-21-acetate. |
| 9 | Prednisone 17-isobutyrate-21-acetate. | MOF | do | 1α, 3-dimethoxy-Δ$^{3,5}$-pregnadiene-17α, 21-diol-11, 20-dione 17-isobutyrate-21-acetate. |
| 10 | Prednisone 17-valerate-21-acetate. | MOF | do | 1α, 3-diemthoxy-Δ$^{3,5}$-pregnadiene-17α, 21-diol-11, 20-dione 17-valerate-21-acetate. |
| 11 | Prednisone 17-valerate | MOF | do | 1α, 3-dimethoxy-Δ$^{3,5}$-pregnadiene-17α, 21-diol-11, 20-dione 17 valerate. |
| 12 | 16α-methyl-prednisone 21-acetate. | MOF | do | 1α, 3-dimethoxy-16α-methyl-Δ$^{3,5}$-pregnadiene-17α, 21-diol-11, 2-dione 21-acetate. |

TABLE I—Continued

| Example No. | Starting compound | Lower alkyl orthoformate | Lower alkanol | Final product |
|---|---|---|---|---|
| 13 | 16α-methyl-prednisone 17-acetate. | MOF | ___do___ | 1α, 3-dimethoxy-16α-methyl-Δ³,⁵-pregnadiene-17α, 21-diol-11, 20-dione 17-acetate. |
| 14 | 16α-methyl-prednisone 21-acetate. | POF | n-propanol | 1α, 3-di-n-propoxy-16α-methyl-Δ³,⁵-pregnadiene-17α, 21-diol-11, 20-dione 21-acetate. |
| 15 | 16β-methyl-prednisone 21-acetate. | MOF | Methanol | 1α, 3-dimethoxy-16β-methyl-Δ³,⁵-pregnadiene-17α, 21-diol-11, 20-dione 21-acetate. |
| 16 | 16β-methyl-prednisone 17-acetate. | EOF | ___do___ | 1α, 3-dimethoxy-16β-methyl-y-Δ³,⁵-pregnadiene-17α, 21-diol-11, 20-dione 17-acetate. |
| 17 | 16β-methyl-prednisone 21-trimethylacetate. | BOF | n-Butanol | 1α, 3-di-n-butoxy-16β-methyl-Δ³,⁵-pregnadiene-17α, 21-diol-11, 20-dione 21-trimethylacetate. |
| 18 | 16-methylene-prednisone 21-acetate. | EOF | ___do___ | 1α, 3-di-n-butoxy-16-methylene-Δ³,⁵-pregnadiene-17,21-diol-11, 20-dione 21-acetate. |
| 19 | 16β-fluoro-prednisone 21-acetate. | MOF | Methanol | 1α, 3-dimethoxy-16β-fluoro-Δ³,⁵-pregnadiene-17α, 21-diol 11, 20-dione 21-acetate. |
| 20 | 16α-fluoro-prednisone 21-acetate. | MOF | ___do___ | 1α, 3-dimethoxy-16α-fluoro-Δ³,⁵-pregnadiene-17α, 21-diol-11, 20-dione 21-acetate. |
| 21 | 16β-chloro-prednisone 21-acetate. | MOF | ___do___ | 1α, 3-dimethoxy-16β-chloro-Δ³,⁵-pregnadiene-17, 21-diol-11, 20-dione 21-acetate. |
| 22 | 16α-chloro-prednisone 21-acetate. | MOF | ___do___ | 1α, 3-dimethoxy-16α-chloro-Δ³,⁵-pregnadiene-17α, 21-diol-11, 20-dione 21-acetate. |
| 23 | 16β-bromo-prednisone 21-acetate. | MOF | ___do___ | 1α, 3-dimethoxy-16β-bromo-Δ³,⁵-pregnadiene-17α, 21-diol-11, 20-dione 21-acetate. |
| 24 | 16α-bromo-prednisone 21 acetate. | MOF | ___do___ | 1α, 3-dimethoxy-16α-bromo-Δ³,⁵-pregnadiene-17α, 21-diol-11, 20-dione 21-acetate. |
| 25 | Prednisone 17-capronate | i-POF | Isopropanol | 1α, 3-di-isopropoxy-Δ³,⁵-pregnadiene-17α, 21-diol-11, 20-dione 17-capronate. |
| 26 | Prednisone 17-oenanthate | EOF | Ethanol | 1α, 3-diethoxy-Δ³,⁵-pregnadiene-17α, 21-diol-11, 20-dione 17-oenanthate. |
| 27 | 16β-methyl-prednisone 17-valerate. | EOF | Methanol | 1α, 3-dimethoxy-16β-methyl-Δ³,⁵-pregnadiene-17α, 21-diol-11, 20-dione 17-valerate. |
| 28 | 16-methylene prednisone | EOF | ___do___ | 1α, 3-dimethoxy-16-methylene-Δ³,⁵-pregnadiene-17α, 21-diol-11, 20-dione. |
| 29 | 16β-methyl-prednisone | MOF | ___do___ | 1α, 3-dimethoxy-16β-methyl-Δ³,⁵-pregnadiene-17α, 21-diol-11, 20-dione. |
| 30 | 16α-methyl-prednisone | MOF | ___do___ | 1α, 3-dimethoxy-16α-methyl-Δ³,⁵-pregnadiene-17α, 21-diol-11, 20-dione. |
| 31 | 16α-fluoro-prednisone | MOF | ___do___ | 1α, 3-dimethoxy-16α-fluoro-Δ³,⁵-pregnadiene-17α, 21-diol-11, 20-dione. |
| 32 | 16β-fluoro-prednisone | MOF | ___do___ | 1α, 3-dimethoxy-16β-fluoro-Δ³,⁵-pregnadiene-17α, 21-diol-11, 20-dione. |
| 33 | 16α-chloro-prednisone | MOF | ___do___ | 1α, 3-dimethoxy-16α-chloro-Δ³,⁵-pregnadiene-17α, 21-diol-11, 20-dione. |
| 34 | 16β-chloro-prednisone | MOF | ___do___ | 1α, 3-dimethoxy-16β-chloro-Δ³,⁵-pregnadiene-17α, 21-diol-11, 20-dione. |
| 35 | 16α-bromo-prednisone | MOF | ___do___ | 1α, 3-dimethoxy-16α-bromo-Δ³,⁵-pregnadiene-17α, 21-diol-11, 20-dione. |
| 36 | 16β-bromo-prednisone | MOF | ___do___ | 1α, 3-dimethoxy-16β-bromo-Δ³,⁵-pregnadiene-17α, 21-diol-11, 20-dione. |
| 37 | 16α-iodo-prednisone | MOF | ___do___ | 1α, 3-dimethoxy-16α-iodo-Δ³,⁵-pregnadiene-17α, 21-diol-11, 20-dione. |
| 38 | 16β-iodo-prednisone | MOF | ___do___ | 1α, 3-dimethoxy-16β-iodo-Δ³,⁵-pregnadiene-17α, 21-diol-11, 20-dione. |
| 39 | 16α-methyl-prednisone 20-ethylene ketal. | MOF | ___do___ | 1α, 3-dimethoxy-20-ethylenedioxy-16α-methyl-Δ³,⁵-pregnadiene-17α, 21-diol-11-one. |
| 40 | 16β-methyl-prednisone 20-ethylene ketal. | MOF | ___do___ | 1α, 3-dimethoxy-20-ethylenedioxy-16β-methyl-Δ³,⁵-pregnediene-17α, 21-diol-11-one. |
| 41 | 16β-methyl-prednisone 21-acetate 20-ethylene ketal. | EOF | Isopropanol | 1α,3-di-isopropoxy-20-ethylenedioxy-16β-methyl-Δ³,⁵-pregnadiene-17α, 21-diol-11-one 21-acetate. |
| 42 | 16α-methyl-prednisone 21-acetate 20-ethylene ketal. | MOF | Methanol | 1α, 3-dimethoxy-20-ethylenedioxy-16α-methyl-Δ³,⁵-pregnadiene-17α, 21-diol-11-one 21-acetate. |
| 43 | 16β-fluoro-prednisone 21-acetate 20-ethylene ketal. | EOF | Ethanol | 1α, 3-diethoxy-20-ethylenedioxy-16β-fluoro-Δ³,⁵-pregnadiene-17α, 21-diol-11-one-21-acetate. |
| 44 | 16β-chloro-prednisone 21-acetate 20-ethylene ketal | EOF | ___do___ | 1α, 3-diethoxy-20-ethylenedioxy-16β-chloro-Δ³,⁵-pregnadiene-17α, 21-diol-11-one 21-acetate. |
| 45 | 16-methylene-prednisone 21-acetate 20-ethylene ketal. | MOF | Methanol | 1α, 3-dimethoxy-20-ethylenedioxy-16-methylene-Δ³,⁵-pregnadiene-21-diol-11-one 21-acetate. |

MOF=methyl orthoformate, EOF=ethyl orthoformate, POF=propyl orthoformate, i-POF=isopropyl orthoformate, BOF=butyl orthoformate.

EXAMPLE 46

A mixture of 5 g. of prednisone 21-acetate, 10 cc. of methanol, 3,75 g. of methyl orthoformate and 50 mg. of p-toluenesulphonic acid is let to stand at room temperature for about 1 hour. Then to the mixture there are added a few drops of water and after a few minutes a crystalline precipitate separates consisting of pure 1α-methoxy-cortisone 21-acetate; M.P. 215–217° C., $$[\alpha]_D^{22} = +193°$$

(dioxane, c.=0.5%).

EXAMPLE 47

A mixture of 5 g. of prednisone 21-acetate, 10 cc. of ethanol, 3,75 mg. of ethyl orthoformate and 50 mg. of p-toluenesulphonic acid is let to stand at room temperature for about 1 hour. Then a few drops of water are added to the mixture and after a few minutes a crystalline precipitate separates, consisting of pure 1α-ethoxy-cortisone 21-acetate; M.P. 238–240° C., $[\alpha]_D^{22} = +197°$ (dioxane, c.=0.5%).

In the Table II are reported other examples of preparation of 1α-alkoxy-Δ4-3-keto pregnenes obtainable according to the procedure set forth in the Examples 46 and 47.

TABLE II

| Example No. | Starting compound | Lower alkyl orthoformate | Lower alkanol | Final product |
|---|---|---|---|---|
| 48 | Prednisone 17,21-diacetate | MOF | Methanol | 1α-methoxy-cortisone 17,21-diacetate. |
| 49 | Prednisone 17,21-dipropionate. | MOF | do | 1α-methoxy-cortisone 17,21-dipropionate. |
| 50 | Prednisone 17-butyrate 21-acetate. | MOF | do | 1α-methoxy-cortisone 17-butyrate 21-acetate. |
| 51 | Prednisone 17-isobutyrate 21-acetate. | MOF | do | 1α-methoxy-cortisone 17-isobutyrate 21-acetate. |
| 52 | Prednisone 17-valerate 21-acetate. | MOF | do | 1α-methoxy-cortisone 17-valerate 21-acetate. |
| 53 | Prednisone 17-valerate. | MOF | do | 1α-methoxy-cortisone 17-valerate. |
| 54 | 16α-methyl-prednisone 21-acetate. | MOF | do | 1α-methoxy-16α-methyl-cortisone 21-acetate. |
| 55 | 16α-methyl-prednisone 17-acetate. | MOF | do | 1α-methoxy-16α-methyl-cortisone 17-acetate. |
| 56 | 16α-methyl-prednisone 21-acetate. | POF | n-Propanol | 1α-n-propoxy-16α-methyl-cortisone 21-acetate. |
| 57 | 16β-methyl-prednisone 21-acetate. | MOF | Methanol | 1α-methoxy-16β-methyl-cortisone 21-acetate. |
| 58 | 16β-methyl-prednisone 17-acetate. | EOF | do | 1α-methoxy-16β-methyl-cortisone 17-acetate. |
| 59 | 16β-methyl-prednisone 21-trimethylacetate. | BOF | n-Butanol | 1α-n-butoxy-16β-methyl-cortisone 21-trimethylacetate. |
| 60 | 16-methylene-prednisone 21-acetate. | EOF | do | 1α-n-butoxy-16-methylene-cortisone 21-acetate. |
| 61 | 16β-fluoro-prednisone 21-acetate. | MOF | Methanol | 1α-methoxy-16β-fluoro-cortisone 21-acetate. |
| 62 | 16α-fluoro-prednisone 21-acetate. | MOF | do | 1α-methoxy-16α-fluoro-cortisone 21-acetate. |
| 63 | 16β-chloro-prednisone 21-acetate. | MOF | do | 1α-methoxy-16β-chloro-cortisone 21-acetate. |
| 64 | 16α-chloro-prednisone 21-acetate. | MOF | do | 1α-methoxy-16α-chloro-cortisone 21-acetate. |
| 65 | 16β-bromo-prednisone 21-acetate. | MOF | do | 1α-methoxy-16β-bromo-cortisone 21-acetate. |
| 66 | 16α-bromo-prednisone 21-acetate. | MOF | do | 1α-methoxy-16α-bromo-cortisone 21-acetate. |
| 67 | Prednisone 17-caproate | i-POF | Iso-propanol | 1α-iso-propoxy-cortisone 17-caproate. |
| 68 | Prednisone 17-oenanthate | EOF | Ethanol | 1α-ethoxy-cortisone 17-oenanthate. |
| 69 | 16β-methyl-prednisone 17-valerate. | EOF | Methanol | 1α-methoxy-16β-methyl-cortisone 17-valerate. |
| 70 | 16-methylene-prednisone | EOF | do | 1α-methoxy-16-methylene-cortisone. |
| 71 | 16β-methyl-prednisone | MOF | do | 1α-methoxy-16β-methyl-cortisone. |
| 72 | 16α-methyl-prednisone | MOF | do | 1α-methoxy-16α-methyl-cortisone. |
| 73 | 16α-fluoro-prednisone | MOF | do | 1α-methoxy-16α-fluoro-cortisone. |
| 74 | 16β-fluoro-prednisone | MOF | do | 1α-methoxy-16β-fluoro-cortisone. |
| 75 | 16α-chloro-prednisone | MOF | do | 1α-methoxy-16α-chloro-cortisone. |
| 76 | 16β-chloro-prednisone | MOF | do | 1α-methoxy-16β-chloro-cortisone. |
| 77 | 16α-bromo-prednisone | MOF | do | 1α-methoxy-16α-bromo-cortisone. |
| 78 | 16β-bromo-prednisone | MOF | do | 1α-methoxy-16β-bromo-cortisone. |
| 79 | 16α-iodo-prednisone | MOF | do | 1α-methoxy-16α-iodo-cortisone. |
| 80 | 16β-iodo-prednisone | MOF | do | 1α-methoxy-16β-iodo-cortisone. |
| 81 | 16α-methyl-prednisone 20-ethylene ketal. | MOF | do | 1α-methoxy-20-ethylenedioxy-16α-methyl-Δ4-pregnene-17α,21-diol-3,11-dione. |
| 82 | 16β-methyl-prednisone 20-ethylene ketal. | MOF | do | 1α-methoxy-20-ethylenedioxy-16β-methyl-Δ4-pregnene-17α,21-diol-3,11-dione. |
| 83 | 16β-methyl-prednisone 21-acetate 20-ethylene ketal. | EOF | Iso-propanol | 1α-iso-propoxy-20-ethylenedioxy-16β-methyl-Δ4-pregnene-17α,21-diol-3,11-dione-21-acetate. |
| 84 | 16α-methyl-prednisone 21-acetate 20-ethylene ketal. | MOF | Methanol | 1α-methoxy-20-ethylenedioxy-16α-methyl-Δ4-pregene-17α, 21-diol-3, 11-dione 21-acetate. |
| 85 | 16β-fluoro-prednisone 21-acetate 20-ethylene ketal. | EOF | Ethanol | 1α-ethoxy-20-ethylenedioxy-16β-fluoro-Δ4-pregnene-17α, 21-diol-3 11-dione 21-acetate. |
| 86 | 16β-chloro-prednisone 21-acetate 20-ethylene ketal. | EOF | do | 1α-ethoxy-20-ethylenedioxy-16β-chloro-Δ4-pregnene-17α, 21-diol-3, 11-dione 21-acetate. |
| 87 | 16-methylene-prednisone 21-acetate 20-ethylene ketal. | MOF | Methanol | 1α-methoxy-20-ethylenedioxy-16-methylene-Δ4-pregnene-17α, 21-diol-3, 11-dione 21-acetate. |

MOF=methyl orthoformate, EOF=ethyl orthoformate, POF=propyl orthoformate, i-POF=iso-propyl orthoformate, BOF=n-butyl orthoformate.

EXAMPLE 88

A mixture of 1 g. of 16β-methyl-prednisone 21-acetate, 5 cc. of anhydrous tetrahydrofurane, 0.5 cc. of methyl orthoformate, 2 cc. of absolute methanol and 25 mg. of p-toluenesulphonic acid is let to stand at room temperature under stirring for two hours. By operating as described in Example 1 the 1α,3-dimethoxy-16β-methyl-21-acetoxy-Δ3,5-pregnadien-17α-ol-11,20-dione is isolated.

500 mg. of 1α,3-dimethoxy-16β-methyl-21-acetoxy-Δ3,5-pregnadien-17α-ol-11,20-dione are dissolved in little methanol and made acid with dilute hydrochloric acid. The solution is boiled for five minutes, then precipitated with water to obtain the 1α-methoxy-16β-methyl-cortisone 21-acetate. The same product is obtained by letting the acidified solution of the starting compound to stay at room temperature for 30 minutes.

EXAMPLE 89

To 200 mg. of 1α-methoxy-cortisone 21-acetate in 2.5 cc. of acetic acid there are added 3 drops of aqueous 5% hydrochloric acid and the mixture is let to stand for 30 minutes on boiling water bath. By precipitating with water a crystalline product is obtained which after recrystallization gives pure prednisone 21-acetate.

Working as above, the same product is obtained starting from the 1α,3-dimethoxy-21-acetoxy-Δ$^{3,5}$-pregnadiene-17α-ol-11,20-dione.

EXAMPLE 90

A mixture of 1 g. of 1α-methoxy-cortisone 20-ethylene ketal, 10 cc. of methanol and 100 mg. of potassium hydroxyde is refluxed for 30 minutes under nitrogen atmosphere, then concentrated. The residue, taken up with water and filtered gives the prednisone 20-ethylene ketal.

EXAMPLE 91

1 g. of 1α,3-dimethoxy-20-ethylenedioxy-21-acetoxy-Δ$^{3,5}$-pregnadiene-17α-ol-11-one, obtained as in Example 4, is dissolved in 20 cc. of anhydrous tetrahydrofurane and the solution is dropped into a suspension of 400 mg. of lithium aluminum hydride in 20 cc. of anhydrous ether. The mixture is refluxed under stirring for about 2 hours, then poured into acidulated ice water and extracted with ether. After evaporation of the solvent the residue gives the 1α,3-dimethoxy-20-ethylenedioxy-21-acetoxy-Δ$^{3,5}$-pregnadiene-11β,17α-diol.

We claim:
1. A member selected from the group consisting of steroid compounds of general formulas

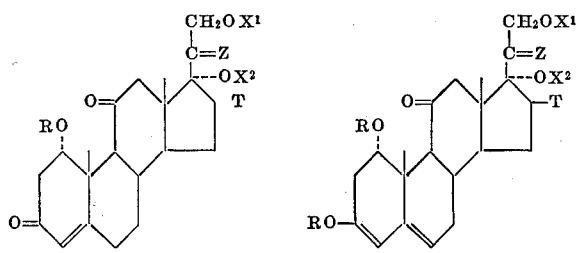

in which R is lower alkyl, T is selected from the group consisting of hydrogen, methylene, α-methyl, β-methyl, α-halogen and β-halogen, Z is selected from the group consisting of ketonic oxygen and a lower alkylene ketal and X$^1$ and X$^2$ are selected from the group consisting of hydrogen and acyl groups derived from carboxylic acids containing up to 9 carbon atoms.

2. 1α,3-dimethoxy-Δ$^{3,5}$-pregnadiene - 17α,21 - diol-11, 20-dione.

3. 1α,3-dimethoxy - 17α - acetoxy-Δ$^{3,5}$-pregnadiene-21-ol-11,20-dione.

4. 1α,3-dimethoxy - 21 - acetoxy-Δ$^{3,5}$-pregnadiene-17α-ol-11,20-dione.

5. 1α,3-dimethoxy - 20 - ethylenedioxy - 21 - acetoxy-Δ$^{3,5}$-pregnadiene-17α-ol-11-one.

6. 1α,3-diethoxy - 21 - acetoxy-Δ$^{3,5}$-pregnadiene-17α-ol-11,20-dione.

7. 1α,3-dimethoxy - 16β - methyl-21-acetoxy-Δ$^{3,5}$-pregnadiene-17α-ol-11,20-dione.

8. 1α-methoxy - 16β - methyl-cortisone 21-acetate.

9. A process for the preparation of 1α,3-dialkoxy-Δ$^{3,5}$-pregnadienes of general formula

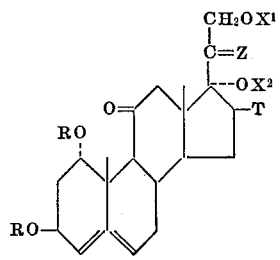

in which R is lower alkyl, T is selected from the group consisting of hydrogen, methylene, α-methyl, β-methyl, α-halogen and β-halogen, Z is selected from the group consisting of ketonic oxygen and a lower alkylene ketal and X$^1$ and X$^2$ are selected from the group consisting of hydrogen and acyl groups derived from carboxylic acids containing up to 9 carbon atoms, which comprises reacting a corresponding Δ$^{1,4}$-3-keto-pregnadiene of general formula

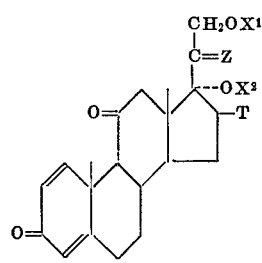

in which T, X$^1$, X$^2$ and Z have the hereinbefore stated meaning, with a lower alkyl orthoformate and an alcohol of formula ROH, in which R is as hereinbefore defined, under anhydrous conditions at a temperature below 60° C. in the presence of an acid catalyst.

10. A process as claimed in claim 9 in which the lower alkyl orthoformate is methyl orthoformate and the lower alkanol is methanol.

11. A process as claimed in claim 9 in which the reaction is carried out at about room temperature.

12. A process as claimed in claim 9 in which the resulting 1α,3-dialkoxy-Δ$^{3,5}$-pregnadiene is hydrolyzed under mild acidic conditions to give the corresponding 1α-alkoxy-Δ$^4$-3-keto-pregnene.

13. A process for the preparation of 1α-alkoxy-Δ$^4$-3-keto-pregnenes of general formula

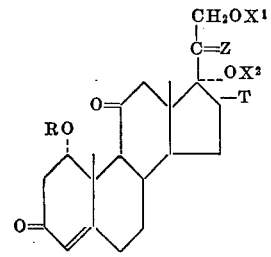

in which R is lower alkyl, T is selected from the group consisting of hydrogen, methylene, α-methyl, β-methyl, α-halogen, and β-halogen, Z is selected from the group consisting of ketonic oxygen and a lower alkylene ketal and X$^1$ and X$^2$ are selected from the group consisting of hydrogen and acyl groups derived from carboxylic acids containing up to 9 carbon atoms, which comprises reacting a corresponding $\Delta^{1,4}$-3-keto-pregnadiene of formula

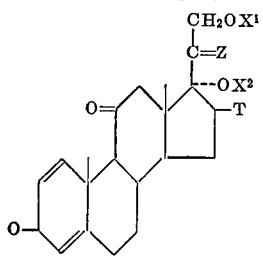

in which T, $X^1$, $X^2$ and Z have the hereinbefore stated meaning, with a lower alkyl orthoformate and an alcohol of formula ROH, in which R is as hereinbefore defined, under anhydrous conditions at a temperature below 60° C. in the presence of an acid catalyst and thereafter working the reaction mixture under aqueous acidic conditions.

14. A process for the preparation of $1\alpha,3$-dimethoxy-20-ethylenedioxy - 21 - acetoxy-$\Delta^{3,5}$-pregnadiene-17$\alpha$-ol-11-one, which comprises reacting prednisone 21-acetate 20-ethylene ketal with methyl orthoformate and methanol at room temperature and in the presence of an acid catalyst.

15. A process as claimed in claim 14, in which the resulting $1\alpha,3$-dimethoxy - 20 - ethylenedioxy-21-acetoxy-$\Delta^{3,5}$-pregnadiene-17$\alpha$-ol-11-one is reduced by a reducing agent selected from the group consisting of alkali metal borohydrides and lithium and aluminum hydride to give the $1\alpha,3$-dimethoxy - 20 - ethylenedioxy-21-acetoxy-$\Delta^{3,5}$-pregnadiene-11$\beta$,17$\alpha$-diol.

References Cited

UNITED STATES PATENTS 2,737,518   3/1956   Herzog _____ 260—397.45

ELBERT L. ROBERTS, Primary Examiner

U.S. Cl. X.R.

260—397.45

UNITED STATES PATENT OFFICE
CERTIFICATE OF CORRECTION

Patent No. 3,506,650          Dated April 15, 1970

Inventor(s) Rinaldo Gardi, et al

It is certified that error appears in the above-identified patent and that said Letters Patent are hereby corrected as shown below:

Column 2, line 34 "condtions" should read "conditions".

Column 3, line 16 delete the repeated phrase "a 1α, 3-dialkoxy derivative in which the alkoxy radical is that of the alcohol employed, and a by-product consisting of the corresponding 1α-ethoxy or"; line 38 amend "pisition" and "streoid" to read respectively "position" and "steroid".

Column 4, line 15 "crystallizetd" should read "crystallized"; line 27 delete "with" and insert "under"; Table I, in the final product of Example 10, "diemthoxy" should read "dimethoxy"; Table I, in the final product of Example 12, "11,2-" should read "11,20-".

Column 5, Table I, in the final product of Examples 18 and 21, "17,21" should read "17α,21"; Table I, the starting compound of Example 23 should read "16β-bromo-prednisone 21-acetate" instead of "16β-bromo-prednisone-21-21-acetate"; Table I, in the final product of Example 40, "$\Delta^{3,5}$-pregnediene" should read "$\Delta^{3,5}$-pregnadiene"; in the last but one line "methyl orthofromate" should read "methyl orthoformate".

Column 7, Table II, in the final product of Example 71, "1α-methyoxy" should read "1α-methoxy"; Table II, in the final product of Example 84, "$\Delta^4$-pregene" should read "$\Delta^4$-pregnene".

UNITED STATES PATENT OFFICE
CERTIFICATE OF CORRECTION

Patent No. 3,506,650               Dated April 14, 1970

Inventor(s) Rinaldo Gardi, et al        PSGE - 2

It is certified that error appears in the above-identified patent and that said Letters Patent are hereby corrected as shown below:

Column 9, the bond linking the substituent T at the 16-position is not shown in the formula on the left; line 56, amend "R is   wer" to read "R is lower".

Column 10, claim 9, the two double bonds reported in the first formula should be amended as follows:

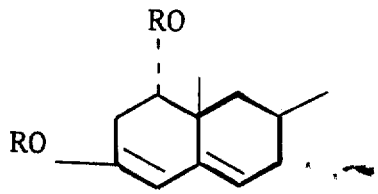

Column 11, (formula) 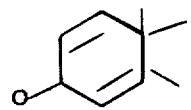 should be 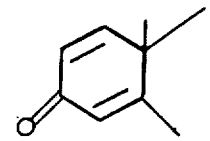

SIGNED AND
SEALED
OCT 13 1970

(SEAL)
Attest:

Edward M. Fletcher, Jr.
Attesting Officer

WILLIAM E. SCHUYLER, JR.
Commissioner of Patents